(12) United States Patent
Niakan et al.

(10) Patent No.: US 7,645,329 B2
(45) Date of Patent: Jan. 12, 2010

(54) COMPOSITE AIR/HYDROCARBON TRAP FILTER ASSEMBLY

(75) Inventors: Shahriar N. Niakan, Anaheim Hills, CA (US); Stuart T. Miyagishima, Upland, CA (US); Jeffrey S. Krangnes, Temecula, CA (US)

(73) Assignee: Advanced Flow Engineering, Inc., Corona, CA (US)

( * ) Notice: Subject to any disclaimer, the term of this patent is extended or adjusted under 35 U.S.C. 154(b) by 205 days.

(21) Appl. No.: 11/981,015

(22) Filed: Oct. 31, 2007

(65) Prior Publication Data

US 2009/0107340 A1    Apr. 30, 2009

(51) Int. Cl.
   *B01D 53/04*    (2006.01)
   *B01D 50/00*    (2006.01)
   *F02M 35/02*    (2006.01)

(52) U.S. Cl. ............................ 96/134; 55/385.3; 55/505

(58) Field of Classification Search .................. 96/134, 96/135, 147, 154; 55/385.3, 498, 505, 510; 123/198 E, 518
   See application file for complete search history.

(56) References Cited

U.S. PATENT DOCUMENTS

| | | | | |
|---|---|---|---|---|
| 3,090,490 A | * | 5/1963 | Yocum | 210/299 |
| 3,572,013 A | * | 3/1971 | Hansen | 96/138 |
| 3,572,014 A | * | 3/1971 | Hansen | 96/138 |
| 3,747,303 A | * | 7/1973 | Jordan | 96/135 |
| 4,259,096 A | * | 3/1981 | Nakamura et al. | 96/138 |
| 4,279,630 A | * | 7/1981 | Nakamura et al. | 96/138 |
| 4,314,832 A | * | 2/1982 | Fox | 55/482 |
| 4,322,230 A | * | 3/1982 | Schoen et al. | 96/138 |
| 6,152,996 A | * | 11/2000 | Linnersten et al. | 96/135 |
| 6,811,588 B2 | | 11/2004 | Niakin | |
| 2005/0217625 A1 | | 10/2005 | Niakin et al. | |
| 2006/0107836 A1 | * | 5/2006 | Maier et al. | 96/134 |
| 2006/0260469 A1 | | 11/2006 | Miyagishima et al. | |
| 2008/0060524 A1 | * | 3/2008 | Tumbrink et al. | 96/154 |

OTHER PUBLICATIONS

Digital photo of prior art original equipment air filter and carbon trap for Toyota vehicles.
Digital photo of prior art air box opened to show separate filters.
Digital photo of prior art AFE aftermarket filter and adapter.
Digital photo of prior art AFE aftermarket filter.

* cited by examiner

*Primary Examiner*—Frank M Lawrence
(74) *Attorney, Agent, or Firm*—Paul J. Backofen, Esq.; Crockett & Crockett (57) ABSTRACT

A tamper resistant hydrocarbon trap and air filter assembly includes a cylindrical carbon trap filter extending from a sealed upstream end to a downstream end seated and sealed in a forwardly facing recess of an adaptor. A conventional cylindrical air filter surrounds the carbon trap filter with a sealed upstream end and a downstream end removable secured to an annular flange on the adaptor with the downstream end of the adaptor being arranged to be coupled to a vehicle's air intake.

16 Claims, 8 Drawing Sheets

COMPOSITE AIR/HYDROCARBON TRAP FILTER ASSEMBLY

FIELD OF THE INVENTION

The present invention relates to air filtration systems that provide clean air to the intake manifold of motor vehicles.

BACKGROUND OF THE INVENTION

An air intake filter functions to remove particulate matter from the air channel to the intake manifold of a motor vehicle. A variety of filter shapes have evolved over time for this purpose, e.g., flat panel, ring, cylindrical and frustoconical (section of a cone) designs. A popular aftermarket frustoconical design, marketed by the assignee, Advanced Flow Engineering, Inc. ("AFE") of this application is shown in the digital photograph attached to the Information Disclosure Statement ("IDS"). This filter is removably mounted on an annular seat formed on the upstream end of an adaptor which joints the inside 5½" diameter of the downstream end of the filter to a 3½" vehicle air intake tube. A series of decreasing internal angles forms the transition between the larger upstream and smaller downstream bores.

While prior art filters have largely served the purpose of removing particulate matter, such as dirt or debris, from the air entering the air intake manifold, albeit some better than others. Such filters provide little help in preventing evaporative emissions from the intake manifold from entering the atmosphere. Such emissions are a particular problem when the engine is turned off and the intake manifold is hot. This source of air pollution has received considerable attention from the federal and state governments with the goal of reducing such emissions.

To that end, the California Air Resources Board ("CARB") which effectively sets the maximum air pollution exhaust standards for all motor vehicles sold by original equipment manufacturers ("OEM's") in the United States has recently passed a regulation which requires that a hydrocarbon trap filter be connected in series with the air intake of most motor vehicle internal combustion engines. In addition to a carbon trap filter an air filter of conventional construction is necessary to remove particulate material, such as dirt or debris, often present in the air available which if not removed can cause substantial damages to the engine components.

Prior art designs of such a combination carbon/trap air filter has resulted in a flat-panel hydrocarbon trap filter relatively permanently secured to a downstream section of a conventional OEM closed air box, to inhibit tampering, with a conventional flat panel air filter releasably secured to an upstream section of the closed air box. One such an arrangement, manufactured by Toyota Motor Company, is shown in the digital photograph, labeled stock dual filter assembly, identified in and attached to the information disclosure statement ("IDS") submitted herewith.

This prior art dual filter assembly is very flow restrictive and as a result engine performance is compromised. There is a need for a more efficient filter arrangement which maintains the tamper resistant characteristics of the OEM carbon trap filter while enhancing the flow of air though the combination filter thereby increasing engine efficiency.

SUMMARY OF THE INVENTION

A tamper resistant hydrocarbon trap and air filter assembly for use with vehicle internal combustion engines, in accordance with the present invention, includes the following three components:

1) A new carbon trap filter, for inhibiting the egress of environmentally unfriendly emissions into the atmosphere, has a generally cylindrical shape. The carbon trap filter is formed with one (and possible more) layers of granulated activated charcoal (GAC) sandwiched between layers of porous material such as plastic netting and/or non-woven unipolyurethene surrounds an open core. The filter extends from a sealed upstream end to an open downstream end. The porous filter media and GAC may be confined within a suitable wire mesh to provide structural strength and rigidity;

2) A conventional generally cylindrical air filter of the dry synthetic or oil impregnated type surrounds the trap filter (when installed) and terminates in a sealed upstream end forward of the trap filter's upstream end. Influent air will pass through the air and carbon trap filters on its way to the intake manifold and evaporative emissions from the engine's air intake will pass in the reverse direction to be trapped in the GAC; and 3) A redesigned tubular filter adaptor supports both the carbon trap and air filters. The adaptor has a downstream end (generally circular in cross-section) adapted to be connected in series with the engine's air intake. The downstream end is joined to a generally circular upstream end with an annular flange adjacent thereto, the flange preferably extending above (i.e., radially outwardly) and rearwardly of the upstream end for releasably supporting the downstream end of the air filter. Preferably the adaptor is formed symmetrically about an imaginary longitudinal axis x-x and progresses from the downstream end through a cylindrical proximal section joined to the upstream end via an outwardly flared distal or transitional section (forming a convex, in cross section, inner surface). The adaptor is provided with a forwardly facing annular recess within which the downstream end of the carbon trap filter is seated and sealed to inhibit tampering. Optionally (and preferably) the inner surface of the distal section is formed with a plurality of decreasing angles (or progressive radii) as it progresses from the upstream end toward the proximal section.

The two filters, referred to generically as generally cylindrical, may be straight, i.e., in the shape of a right cylindrical or tapered with a circular cross-section of an increasing diameter towards the downstream end i.e., forming a conical section ("frustoconical"). The filters may also be provided with an elliptical or oval cross-section. Preferably, the carbon trap filter is pleated to maximize the surface area available for incoming and outgoing flow.

The improvement in performance of the composite filter of the present invention, we believe, is impressive. The factory system, as shown in the IDS photograph, when measured in AFE's factory, with a differential pressure of 1½ inches of water (across the combined filter assembly) provided a flow rate of 96 cubic feet per minute ("CFM"). In contrast, our composite filter assembly, when tested under the identical condition, i.e., pressure differential of 1½" of water, provided a flow rate of 150 CFM, a 50% increase in performance.

The construction and use of the present invention may best be understood by reference to the following description taken in conjunction with the appended drawings.

DESCRIPTION OF THE PREFERRED EMBODIMENT

Figure 12:
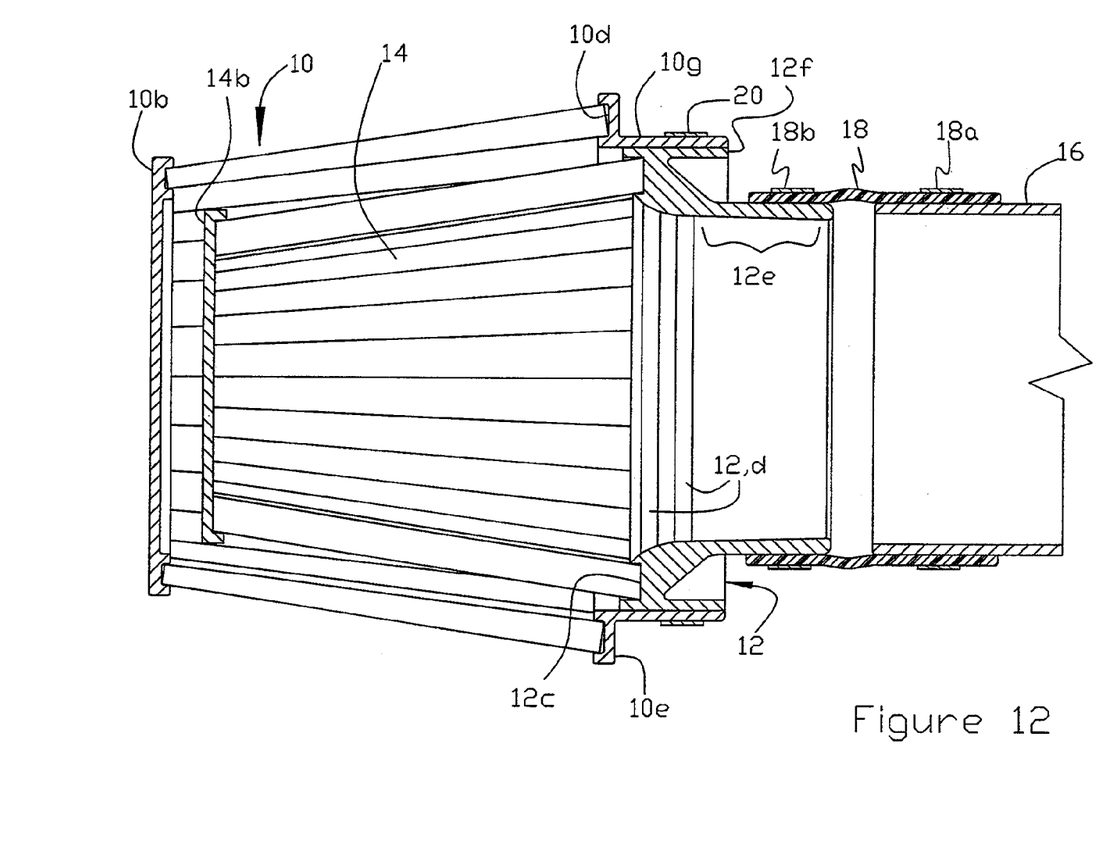
FIG. 12 is a cross-sectional view of the assembled composite carbon trap and air filter assembly installed on an internal combustion engine's air intake tube.

Referring now to the drawings and particularly to FIGS. 1-8 and 12 a conventional air filter 10 suitable for use in the present invention has a generally cylindrical shape (illustrated as frustoconical) with a pleated media side wall 10a extending between a sealed downstream end 10b (in the form of a conventional plastic disc) to upstream end 10c sealed (via a suitable bonding agent such as urethane) in a forwardly extending annular recess 10d (FIG. 12) formed in a rib 10e of an L-shaped support member 10f (FIG. 12). The support member 10f is formed with an axially projecting collar 10g arranged to be releasably secured to a flange 12f of the dual filter adapter 12 on which is mounted and sealed, e.g., via a urethane sealant, a carbon trap filter 14. See FIG. 2.

Figure 1:
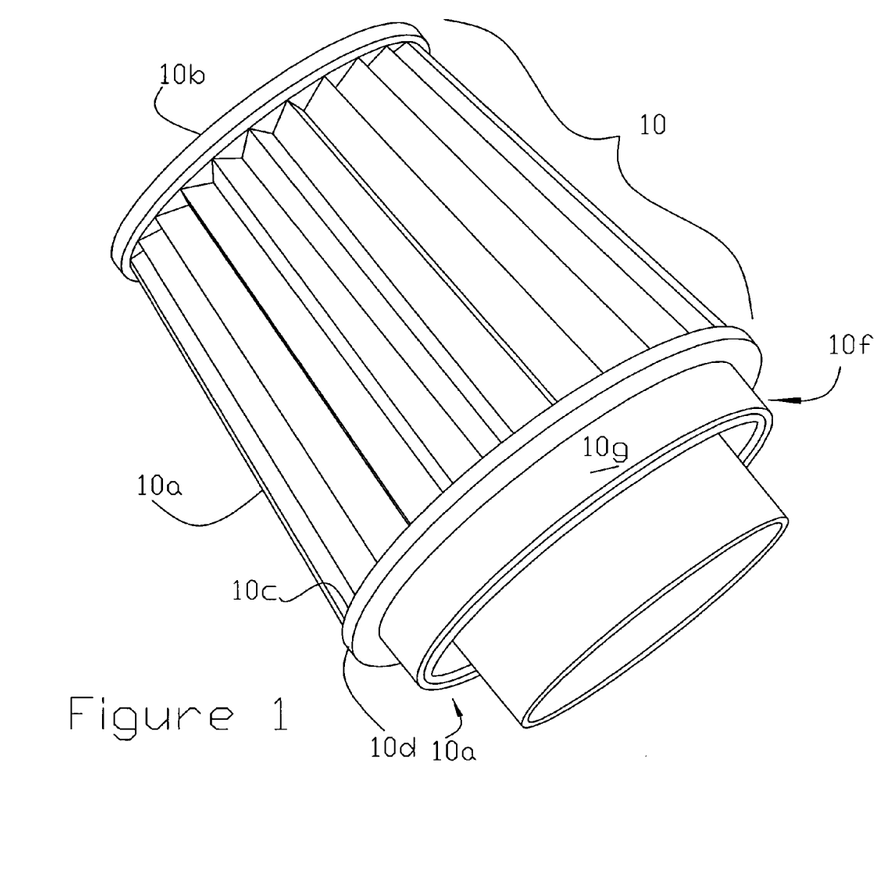
FIG. 1 is a perspective view of the composite filter assembly in accordance with the invention.
Figure 2:
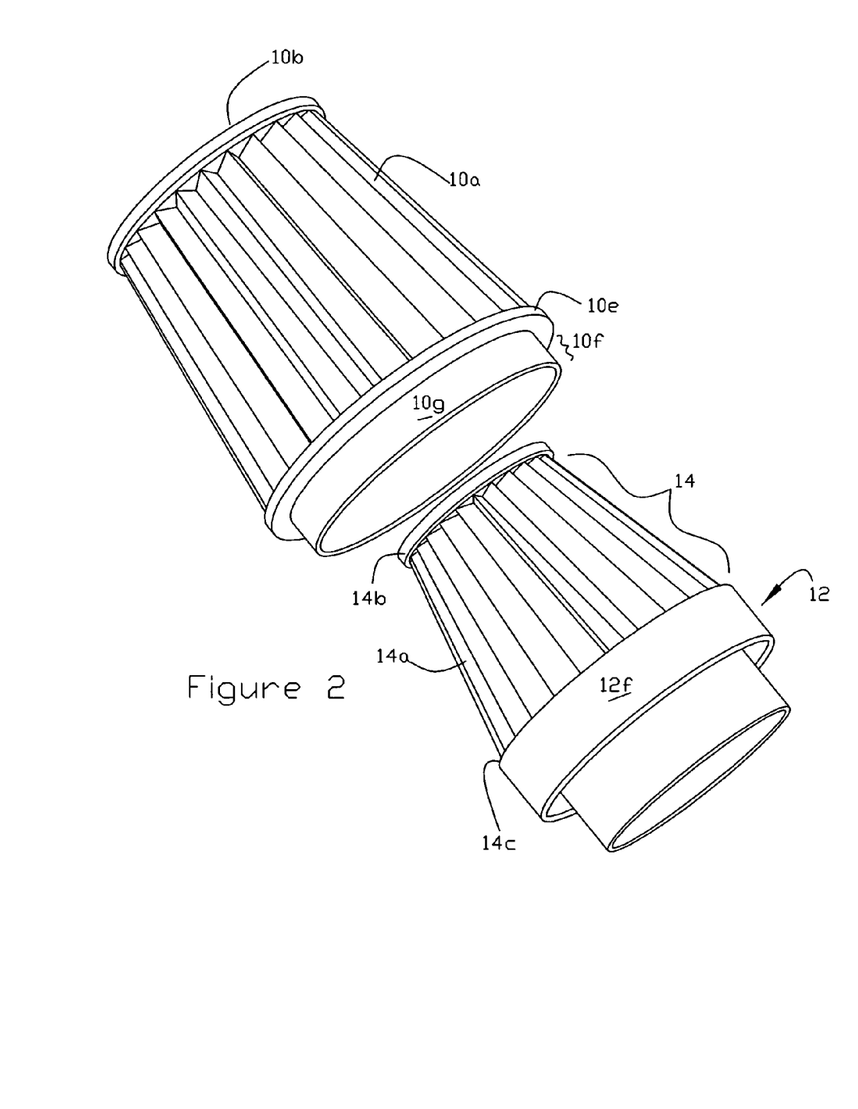
FIG. 2 is an exploded view of the unassembled composite filter assembly in which both filters are of the pleated type.

The carbon trap filter 14 also has a pleated side wall 14a extending from a sealed end 14b, also in the form of a plastic disc, to an upstream end 14c, sealed within a forwardly facing groove 12c in the adaptor 12 described below.

Figures 3, 4, 5:
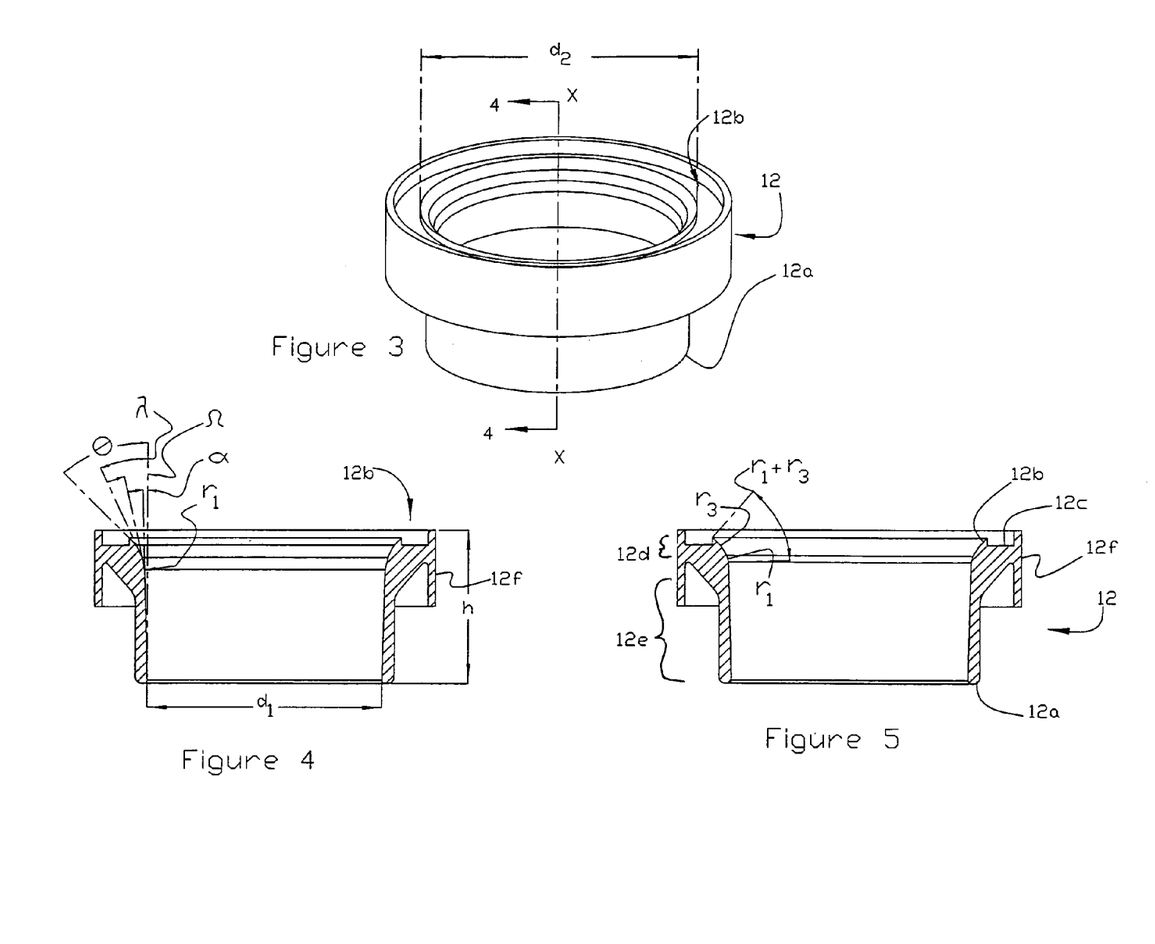
FIG. 3 is a cross-sectional view of the carbon trap filter and filter adaptor taken along lines 3-3 of FIG. 2.
FIGS. 4 and 5 are cross-sectional views of the filter adaptor in which the inner surface of the distal or transitional section forms a plurality of decreasing angles or progressive radii, respectively, as it progresses from the upstream end to the proximal section.

Referring now to FIGS. 3-5 the adaptor 12, formed symmetrically about an imaginary axis x-x, is arranged to support both the carbon trap and air filters. The adaptor is tubular in form with a downstream end 12a having a generally circular cross-section of a diameter d1 adapted to be connected to the vehicle engine's air in take as is illustrated in FIG. 12. The downstream end is joined to a generally circular upstream end 12b (having a diameter d2 and defining a forwardly facing annular recess 12c) via a generally cylindrical proximal section 12e and an outwardly flared distal or transitional section 12d. The downstream end of the carbon trap filter 14 is seated and sealed (via a suitable sealant such a urethane) in the recess 12c. The adaptor includes an annular flange 12f extending above and rearwardly of the upstream end of the adaptor, as shown, to receive the collar 10g of the air filter as is shown more particularly in FIG. 12.

Referring now to FIG. 4 the inner surface of the flared distal or transitional section 12d of the adaptor is formed with a series of decreasing angles (to the axis x-x), i.e., θ, λ, and Ω, in that order (preferably culminating in a radius r1) as it progresses from the upstream end to proximal section 12e. The angles θ, λ, and Ω are 45°, 25° and 12.5°, respectively. While the configuration of the inner surface of the adaptor is not new, the angles and radius r1 do provide a more efficient air flow for the new composite filter.

Alternatively the inner surface of the transitional section is formed with a plurality of radius, as it progresses from the upstream end, such as r3 of about 1.75" and r1 of about 0.250".

The wall of the cylindrical proximal section 12e is preferably curved slightly outwardly from the vertical as it progresses to the downstream end 12a, along an angle α of about 1.5°. The use of the term cylindrical in describing the proximal section 12e encompasses this slight angle to the axis x-x.

Figure 6:
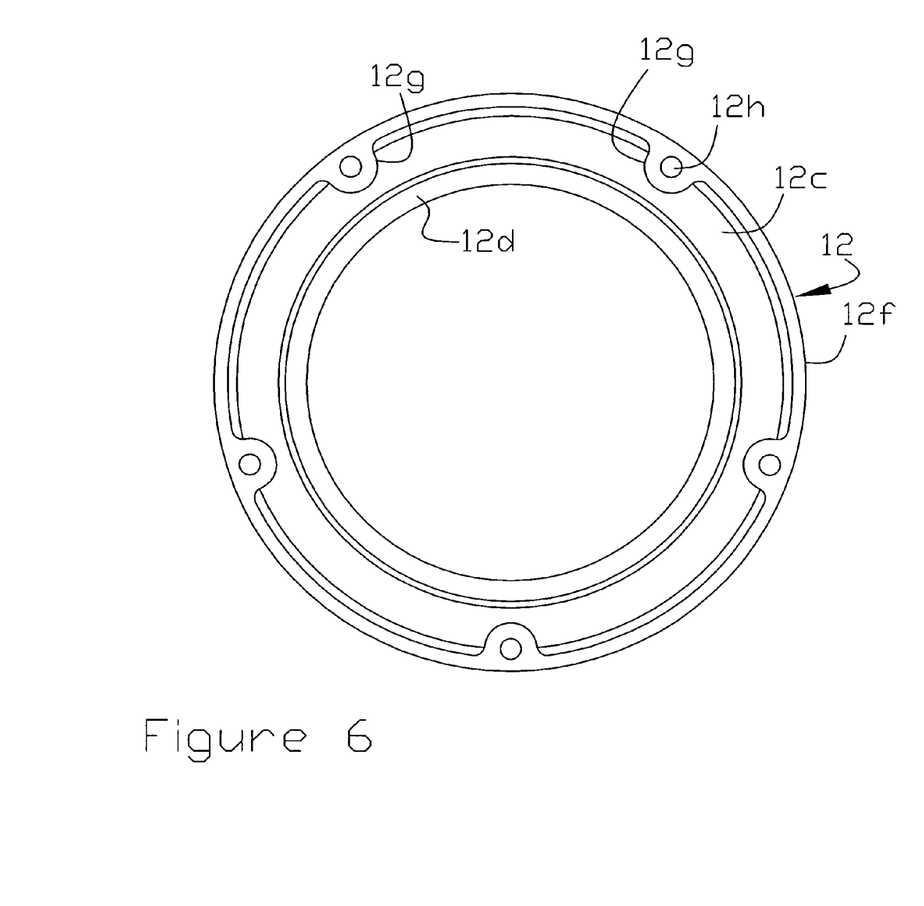
FIG. 6 is an upstream end view of the adaptor of FIGS. 4 and 5, i.e., looking toward the downstream end.

FIG. 6 is a front elevational view of the adaptor looking toward the downstream end illustrating five semicircular radial inwardly projecting extensions 12g with blind threaded holes 12h. The threaded holes serve the purpose of allowing the adaptor to be mounted in an enclosure or other structure (not shown).

Figure 7:
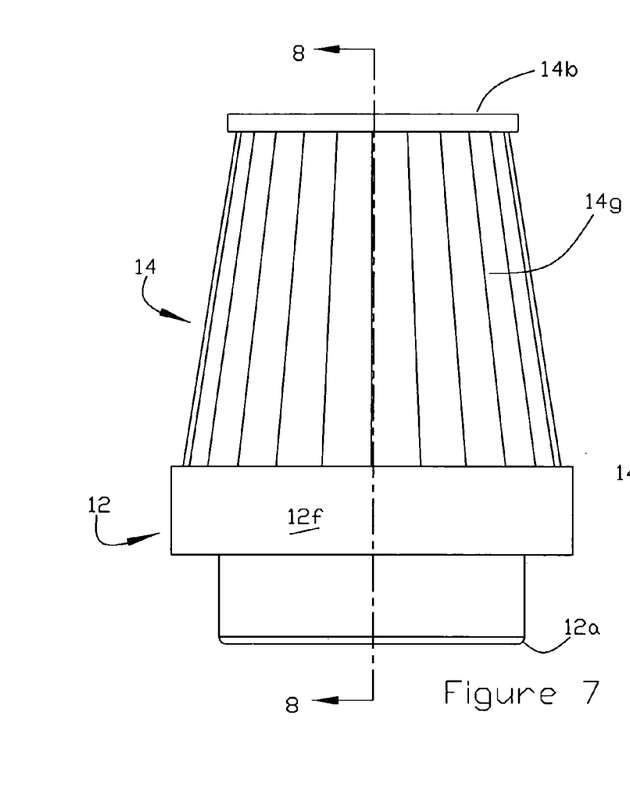
FIGS. 7 and 8 are front elevational and cross-sectional views of a pleated carbon trap filter installed on the adaptor.
Figure 8:
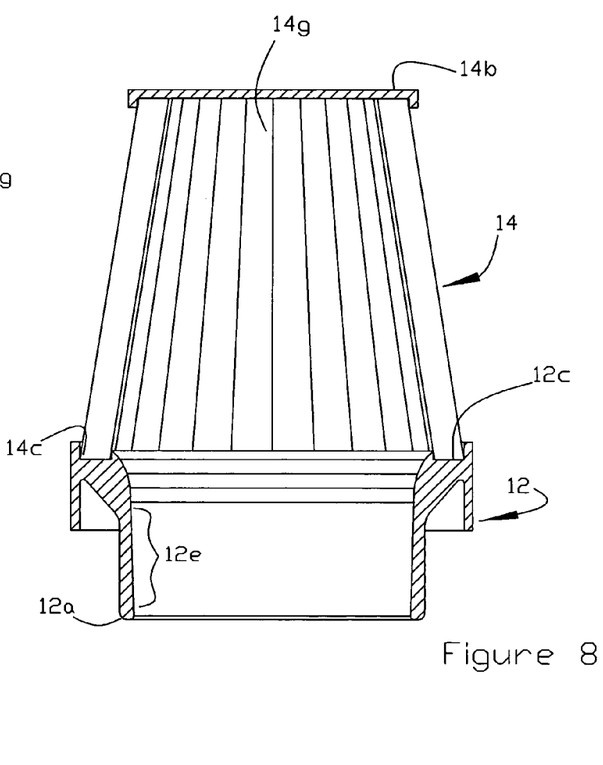
Figure 11:
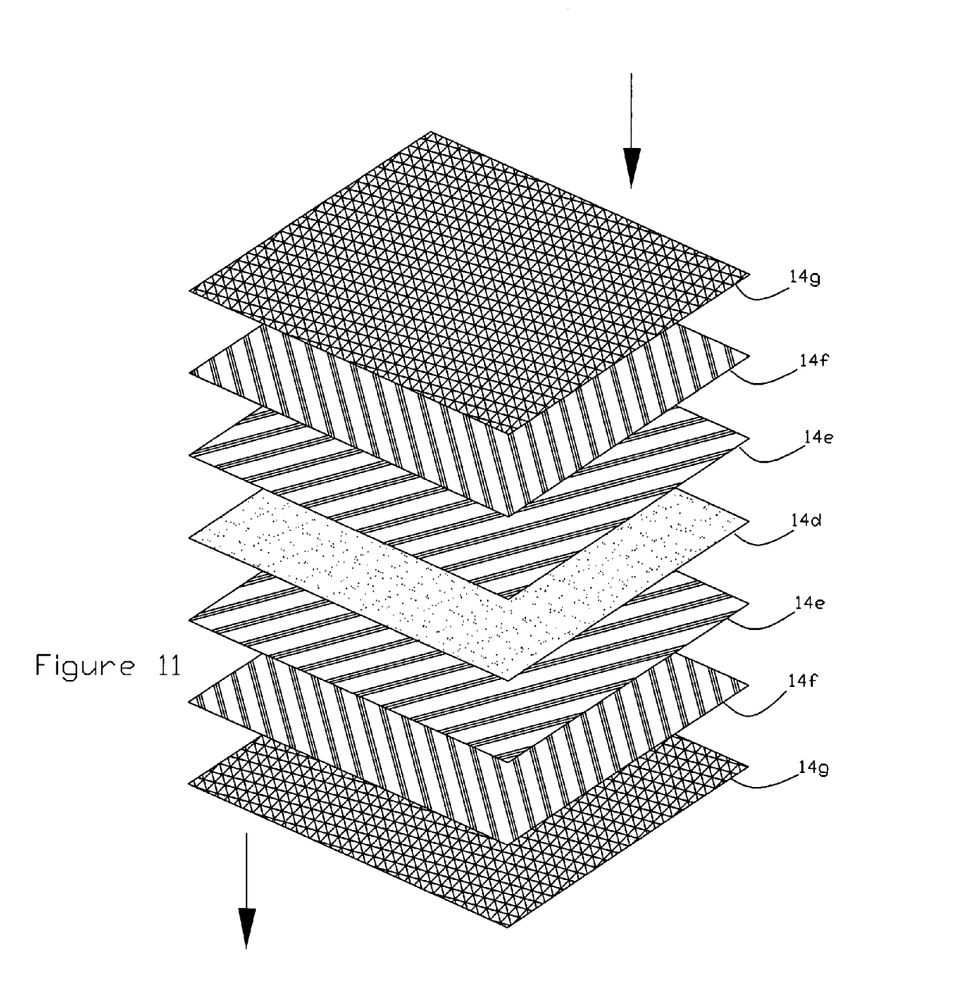
FIG. 11 is a partial perspective view showing the separate layers of the carbon trap filter.

FIGS. 7 and 8 illustrate a pleated frusto-conical carbon tap filter 14 with the downstream end seated in the recess 12c of the adaptor. The individual components of the filter, before assembly, are shown in FIG. 11. The innermost layer 14d of the filter is GAC, preferably in pellet form, and is confined or sandwiched between two layers 14e of a porous media material such as plastic netting, e.g., Naltex®. The GAC and porous material layers 14d and 14e are preferably confined between sheets 14f of a non-woven plastic filter media such as unipoly.

Figure 9:
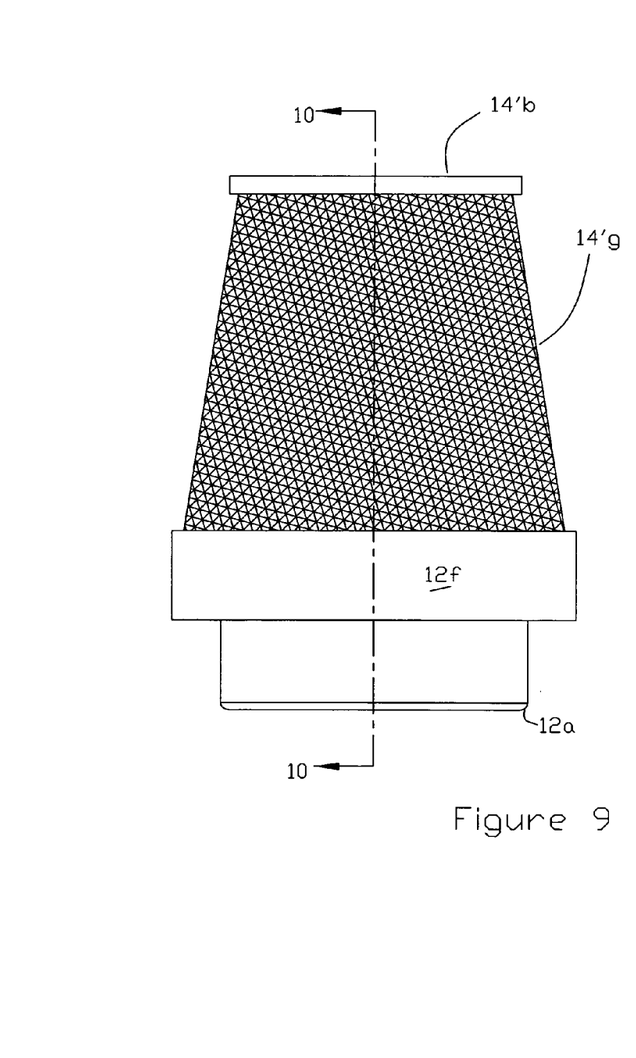
FIGS. 9 and 10 are front elevational and cross-sectional views of an unpleated carbon trap filter installed on the adaptor.
Figure 10:
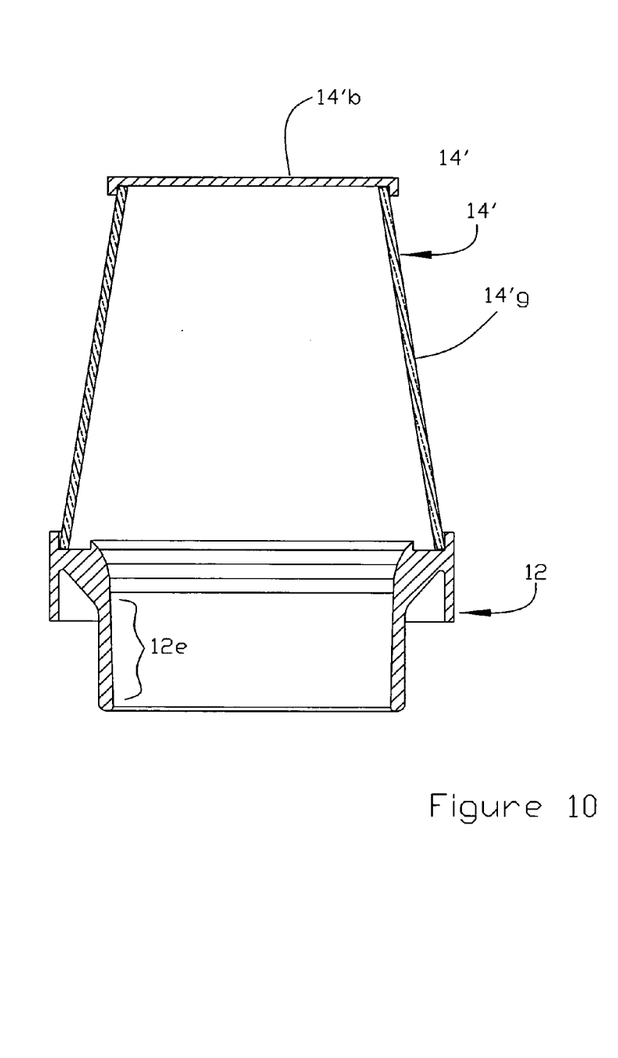

The GAC layer 14d and surrounding porous material layers 14e-f are confined between two sheets 14g of a structural wire mesh material, preferably single warp, to provide strength and rigidity to the finished filter. The several layers are then pleated to maximize the area for influent air and formed into the final shape, e.g., generally cylindrical, and preferably frusto-conical as is illustrated in FIGS. 7 and 8. Alternatively, the side walls of the carbon trap filter 14' may be unpleated as is illustrated in FIGS. 9 and 10.

FIG. 12 illustrates, in a cross-sectional view, the composite filter assembly installed on an internal combustion engine's air intake 16 via a hose coupling 18 and hose clamps 18a and 18b. The collar 10g of the air filter bracket 10f is mounted on the flange 12f via a conventional hose clamp 20. The hose clamp 20 allows the air filter to be removed, washed and replaced.

A novel and highly efficient composite air/hydrocarbon trap filter has been described. Variations and perhaps improvements thereto will undoubtedly occur to those skilled in the art without departing from the spirit and scope of the invention as it is described in the appended claims.

What is claimed is:

1. A tamper resistant hydrocarbon trap and air filter assembly for vehicle internal combustion engines comprising:
    a) a tubular filter adaptor having a generally circular downstream end joined to a generally circular upstream end and terminating in an annular flange extending above the upstream end for accommodating the downstream end of an air filter;
    b) a generally cylindrical hydrocarbon trap filter formed with a layer of activated carbon granules sandwiched between two layers of a porous material enclosing an open core and extending from a sealed upstream end to a downstream end secured to the upstream end of the adaptor so that air passing between the two ends of the trap's filter is channeled through the upstream end of the adaptor; and
    c) a generally cylindrical air filter surrounding the trap filter and extending from a sealed upstream end forward of the trap filter's upstream end to a downstream end secured to the adaptor annular flange.

2. The invention of claim 1 wherein the downstream end of the air filter includes a support member having an annular collar which extends around and is secured to the adaptor flange.

3. The invention of claim 2 wherein the trap filter is formed with a layer of granular activated charcoal disposed between two or more layers of porous material confined between two layers of mesh wire.

4. The invention of claim 3 wherein both the air and trap filters have a frustoconical shape.

5. The invention of claim 1 wherein the diameter of the upstream end of the adaptor is greater than the diameter of the downstream end.

6. The invention of claim 5 wherein the tubular adaptor is formed symmetrically about an imaginary longitudinal axis x-x with a cylindrical proximal section extending from the downstream end joined to the upstream end through an outwardly flared distal section forming a convex inner surface.

7. The invention of claim 6 wherein the inner surface of the distal section forms a plurality of decreasing angles with the longitudinal axis as the distal section transitions from the distal toward the proximal section.

8. A composite air/hydrocarbon trap filter assembly adapted to be connected in series with the air intake of an internal combustion engine in which the air filter is removable for cleaning or replacement comprising:
  a) a tubular adapter having a generally circular downstream end of a first diameter d1 for connection to the engine's air intake, then progressing to a cylindrical section then an outwardly flared transitional section to a generally circular upstream end having a second diameter d2 and terminating in an annular flange extending above and rearwardly of the upstream end for receiving the downstream end of a removable air filter, where d1<d2;
  b) a generally cylindrical hydrocarbon trap filter formed with at least one layer of GAC sandwiched between one or more layers of a porous material surrounding an open core and extending from a sealed upstream end to a downstream end secured to the upstream end of the adaptor so that influent air between the trap filter ends is channeled through the upstream end of the adaptor; and
  c) a generally cylindrical air filter formed with an annular shoulder at its downstream end having a curvature complementary with and releasably secured to the adaptor annular flange, the air filter surrounding the trap filter and terminating in a sealed upstream end forward of the trap filter's upstream end so that influent air will pass through the carbon trap filter on its way to the adaptor's upstream end.

9. The filter assembly of claim 8 wherein the GAC/porous material layers of the trap filter and the filter media of the air filter are pleated to increase the influent surface area of the respective filters.

10. The filter assembly of claim 8 wherein the GAC/porous material of the trap filter is non-pleated.

11. The filter assembly of claim 10 wherein the upstream end of the adaptor is formed with an annular rearwardly extending recess for receiving the downstream end of the trap filter.

12. The filter assembly of claim 11 wherein the layers of GAC and porous material are confined between layers of a structural wire mesh.

13. The filter assembly of claim 12 wherein the trap and air filter are frusto-conical in shape.

14. A composite air/hydrocarbon trap filter for connection in series with an internal combustion engine's air intake comprising:
  a) a tubular adaptor having a generally circular downstream end joined to a generally circular upstream end through a flared transitional section with a forwardly facing annular recess surrounding the upstream end and an annular flange encircling the recess and extending rearwardly thereof toward the downstream end;
  b) a generally cylindrical hydrocarbon trap filter formed with at least one layer of GAC sandwiched between one or more layers of a porous filter media and extending from a sealed upstream end to a downstream end seated and sealed within the adaptor recess; and
  c) a generally cylindrical air filter containing conventional air filtration media surrounding the carbon trap filter with a sealed upstream end and a downstream end secured to the adaptor's annular flange so that influent air will pass through the carbon trap filter on its way to the upstream end of the adaptor.

15. The composite filter of claim 14 wherein both filters are frustoconical in shape.

16. The composite filter of claim 15 wherein the filters are formed with pleated side walls.

\* \* \* \* \*